United States Patent
Ghosh et al.

(10) Patent No.: US 9,946,724 B1
(45) Date of Patent: Apr. 17, 2018

(54) SCALABLE POST-PROCESS DEDUPLICATION

(71) Applicant: EMC Corporation, Hopkinton, MA (US)

(72) Inventors: Sourav Ghosh, Sammamish, WA (US); Jeffrey Tremaine, Seattle, WA (US); Matthew Fleming, Santa Clara, CA (US); Eric M. Lemar, Seattle, WA (US); Mayank Rajawat, Issaquah, WA (US); Harsha Mahuli, Sammamish, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 212 days.

(21) Appl. No.: 14/230,863

(22) Filed: Mar. 31, 2014

(51) Int. Cl.
 G06F 7/00 (2006.01)
 G06F 17/00 (2006.01)
 G06F 17/30 (2006.01)

(52) U.S. Cl.
 CPC .............. G06F 17/30156 (2013.01)

(58) Field of Classification Search
 CPC ......... G06F 17/30156; G06F 17/30303; G06F 17/30159; G06F 17/30371; G06F 3/0641
 USPC ........................................................ 707/692
 See application file for complete search history.

(56) References Cited

U.S. PATENT DOCUMENTS

| | | | | |
|---|---|---|---|---|
| 8,140,821 B1* | 3/2012 | Raizen | ................ | G06F 11/1448 707/637 |
| 8,180,740 B1* | 5/2012 | Stager | ............... | G06F 17/30159 707/660 |
| 8,452,732 B2* | 5/2013 | Yakushev | ............. | G06F 3/0608 707/654 |
| 8,548,953 B2* | 10/2013 | Wong | ................ | G06F 17/30153 707/664 |
| 8,577,850 B1* | 11/2013 | Genda | ................... | G06F 3/0641 707/692 |
| 8,639,669 B1* | 1/2014 | Douglis | ............ | G06F 17/30159 707/692 |
| 2009/0271402 A1* | 10/2009 | Srinivasan | .......... | G06F 17/3015 |
| 2010/0332401 A1* | 12/2010 | Prahlad | ............... | G06F 17/3002 705/80 |
| 2011/0055471 A1* | 3/2011 | Thatcher | ............... | G06F 3/0608 711/114 |
| 2011/0218972 A1* | 9/2011 | Tofano | ............. | G06F 17/30159 707/692 |

(Continued)

*Primary Examiner* — Hosain Alam
*Assistant Examiner* — Nicholas Allen

(57) ABSTRACT

Implementations are provided herein for data deduplication, and more particularly, to post-process data deduplication on a large scale out storage system. Multiple techniques and implementations are disclosed that offer greater efficiency, higher performance, and more stability when performing post-process data deduplication at large scale. Disclosed implementations are based on a process for data deduplication involving four main phases: enumeration, commonality, sharing, and update. Multi-level hashing can be used to identify candidates for deduplication during the enumeration phase, providing a more efficient use of compute resources. In addition, datasets can be phase rotated through the post-process deduplication steps providing a more controllable deduplication environment as well as a more efficient use of resources.

18 Claims, 10 Drawing Sheets

(56) References Cited

U.S. PATENT DOCUMENTS

| | | | | |
|---|---|---|---|---|
| 2011/0218973 A1* | 9/2011 | Pendlebury | G06F 17/30156 | 707/692 |
| 2011/0231362 A1* | 9/2011 | Attarde | G06F 11/3442 | 707/609 |
| 2011/0238635 A1* | 9/2011 | Leppard | G06F 17/30159 | 707/693 |
| 2011/0258404 A1* | 10/2011 | Arakawa | G06F 3/0608 | 711/162 |
| 2012/0124013 A1* | 5/2012 | Provenzano | G06F 17/30156 | 707/692 |
| 2012/0150826 A1* | 6/2012 | Vijayan Retnamma | G06F 17/30312 | 707/692 |
| 2012/0158672 A1* | 6/2012 | Oltean | G06F 17/30091 | 707/692 |
| 2012/0159098 A1* | 6/2012 | Cheung | G06F 12/0261 | 711/162 |
| 2013/0097380 A1* | 4/2013 | Colgrove | G06F 17/30159 | 711/118 |
| 2013/0173553 A1* | 7/2013 | Apte | G06F 7/00 | 707/640 |
| 2013/0173560 A1* | 7/2013 | McNeill | G06F 17/30303 | 707/692 |
| 2013/0212074 A1* | 8/2013 | Romanski | G06F 17/30156 | 707/692 |
| 2013/0226978 A1* | 8/2013 | Bestler | G06F 17/30312 | 707/827 |
| 2013/0238570 A1* | 9/2013 | Rao | G06F 17/30156 | 707/692 |
| 2013/0238832 A1* | 9/2013 | Dronamraju | G06F 3/0608 | 711/103 |
| 2013/0246580 A1* | 9/2013 | Ozawa | H04L 67/1097 | 709/219 |
| 2013/0275656 A1* | 10/2013 | Talagala | G06F 12/0246 | 711/103 |
| 2013/0326115 A1* | 12/2013 | Goss | G06F 3/0641 | 711/103 |
| 2013/0332558 A1* | 12/2013 | Condict | G06F 3/0641 | 709/214 |
| 2013/0339319 A1* | 12/2013 | Woodward | G06F 17/30581 | 707/692 |

* cited by examiner

| REVERSE MAPPING TABLE | |
|---|---|
| SHADOW STORE INODE | ASSOCIATED FILE INODES |
| 0001 | 0001, 0047, 0096 |
| 0002 | 0009, 0175 |
| 0003 | 2475, 0008 |

FIG. 3

SCALABLE POST-PROCESS DEDUPLICATION

FIELD OF THE INVENTION

This invention relates generally to processing data, and more particularly to systems and methods for scalable post-process deduplication within large scale storage systems.

BACKGROUND OF THE INVENTION

Distributed file systems offer many compelling advantages in establishing high performance computing environments. One example is the ability to easily expand, even at large scale. For example, an individual or business that stores large amounts of data, such as video data, may need to plan for continued expansion of storage space as they store additional video data. One means to meet that need would be to purchase additional storage capacity. However, beyond just purchasing additional storage, there may be a desire to reduce the amount of data being stored without reducing the scope and/or content of the data that is being stored.

One method for reducing the footprint of a large data storage network is deduplication. Deduplication can reduce the amount of storage space needed within a data storage system by eliminating duplicate copies of repeated data. In general, deduplication provides for determining when two or more data blocks, files, and/or objects contain the same data, eliminating redundant copies of the data, while maintaining data integrity for all versions or copies of the data.

One type of data deduplication is post-process deduplication. Post process deduplication allows new data to be first stored and accessed within a data storage system conventionally. Then, at a later time than when data is first written into the storage system, a post-process deduplication process can begin that locates commonality within the storage system and eliminates redundancy. However, in very large scale storage systems, post-process deduplication can take considerable amounts of time and/or consume large amounts of storage system resources. While a post-process deduplication process may conserve storage space within a data storage system by eliminating redundancy, if the performance penalty incurred when conducting the post-process deduplication is too high, and/or the process takes too long, the benefits of deduplication may not outweigh be worth the drawbacks. Thus, in providing post-process deduplication on large scale storage systems, there exists a need to provide an efficient process that minimizes the impact for data storage system performance outside the post-process deduplication process.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a set of datasets of a file system can be generated, wherein the set of datasets includes at least a first dataset and a second dataset. The first dataset can be ingested, wherein ingesting a dataset includes: scanning the dataset and generating a set of low level hashes based on the scanning, wherein low level hashes in the set of low level hashes are associated with a block address of the file system; analyzing the set of low level hashes and determining a set of potential matching candidates; generating a set of high level hashes based on the set of potential matching candidates and associated block addresses; and adding the set of high level hashes and associated block addresses to a candidate table. A set of shareable blocks can be determined by comparing high level hashes in the set of high level hashes of the candidate table with other high level hashes of the candidate table and an index table, wherein the index table contains a set of high level hashes and associated shadow store block addresses. The file system can be updated based on the set of shareable blocks. In response to the updating of the file system, the second dataset can then be ingested.

In accordance with another aspect, a phase rotation component can generate a set of datasets of a file system, wherein the set of datasets includes at least a first dataset and a second dataset, and wherein the phase rotation component can send the first dataset to an enumeration component for ingestion. The enumeration component can ingest a dataset by: scanning the dataset and generating a set of low level hashes based on the scanning, wherein low level hashes in the set of low level hashes are associated with a block address of the file system; analyzing the set of low level hashes and determining a set of potential matching candidates; generating a set of high level hashes based on the set of potential matching candidates and associated block addresses; and adding the set of high level hashes and associated block addresses to a candidate table. A commonality component can determine a set of shareable blocks by comparing high level hashes in the set of high level hashes of the candidate table with other high level hashes of the candidate table and an index table, wherein the index table contains a set of high level hashes and associated shadow store block addresses. A sharing component can update the file system based on the set of shareable blocks, wherein, in response to the sharing component updating the file system, the phase rotation component can send the second dataset to the enumeration component for ingestion.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 3 illustrates an example reverse mapping table in accordance with implementations of this disclosure;

DETAILED DESCRIPTION

Figure 1:
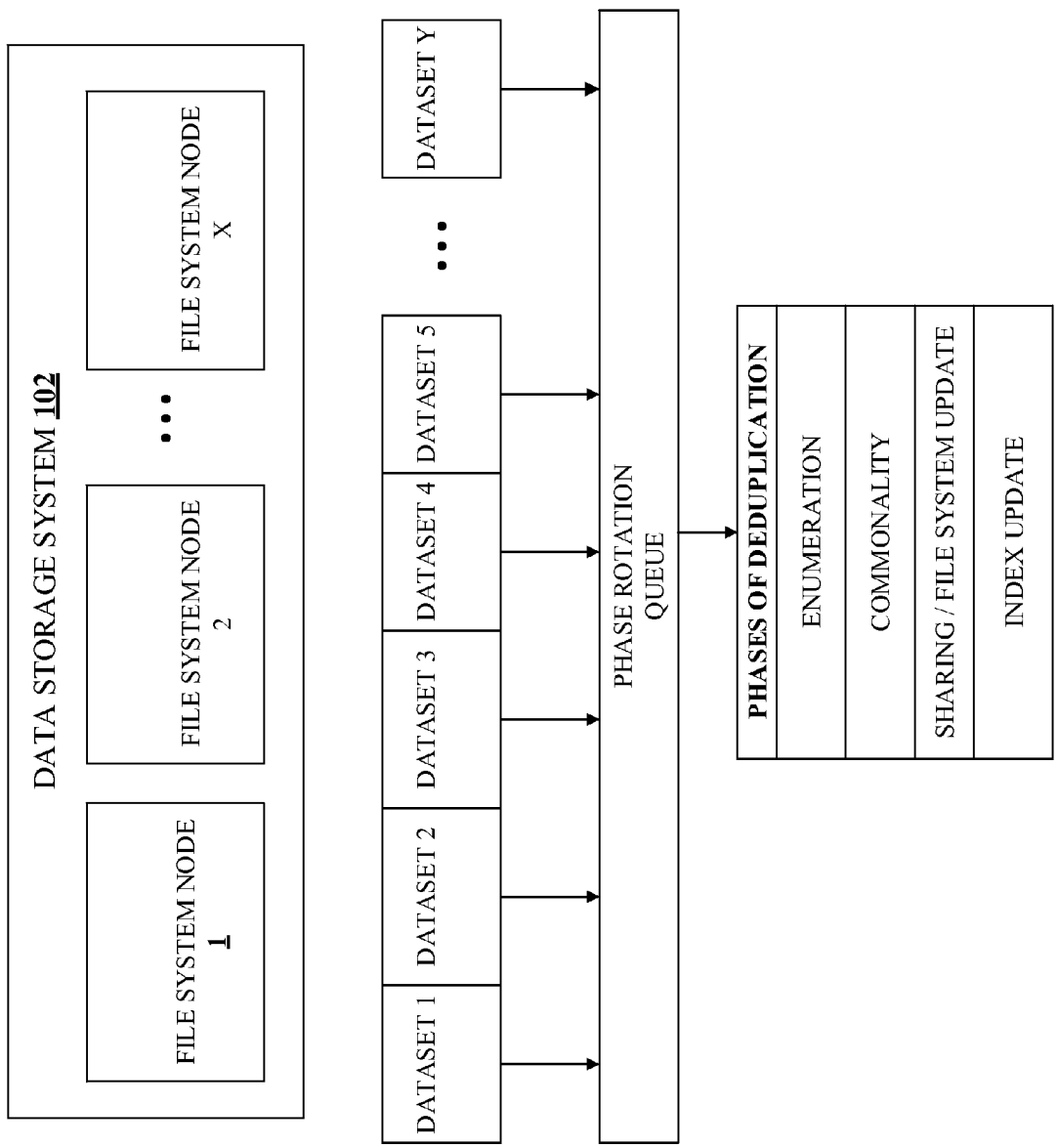
FIG. 1 illustrates an example of phase rotation of datasets in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

Implementations are provided herein for data deduplication, and more particularly, to post-process data deduplication on a large scale out storage system. Post-process deduplication differs from in-line deduplication in that data is first stored within the data storage system under normal operating conditions, and then at a later time, is processed for data deduplication. Multiple techniques and implementations are disclosed that offer greater efficiency, higher performance, and more stability when performing post-process data deduplication at large scale. In most of the implementations disclosed herein, post-process data deduplication involves four main phases. The first being enumeration where the file system is scanned, blocks and/or files are sampled, and fingerprints are generated based on the sampled blocks and/or files. During the enumeration phase, fingerprints that are generated are stored in a candidate table for use in later phases. The second phase is a commonality phase where two blocks that share a fingerprint match are identified by comparing fingerprints in the candidate table with other fingerprints in the candidate table and previously matched fingerprints in an index table. The third phase is a sharing phase where blocks associated with identified matches are deduplicated, for example, by replacing stored data with a pointer that points to a block address in the shadow store that contains a copy of the data. Thus, multiple blocks and/or files that match can point to a single block and/or file in the shadow store. The fourth phase is an index table update phase that updates index tables based on the actions taken during the sharing phase.

In one implementation, multi-level hashing is used to identify candidates for deduplication during the enumeration phase. Computing a large fingerprint, e.g., a high level hash, for each block of a data storage system can be computationally expensive, in that, generating large amounts of high level fingerprints consumes a correspondingly large amount of compute resources. By using multi-level hashing, a first level, or low-level hash can be computed for every block and/or file of the data storage system. In one implementation, the low-level hash can be generated as a part of normal file system operations, such as for use in error checking. For example, using previously generated low-level hashes, such as a 32-bit checksum, can consume significantly less resources than generating high-level hashes for each block of the file system. In another implementation, low level hashes can be generated as a part of the deduplication process and subsequently read for analysis. After reading the set of low-level hashes, an analysis can determine which low-level hashes are potential matching candidates, and high-level hashes can then be generated for those potential matching candidates. Thus, relatively computationally expensive high-level hashes are generated on a much smaller scale than relatively computationally cheap low-level hashes. In this sense, high-level hashes are still generated for potential matching candidates; however, computational resource aren't wasted in generating high-level hashes for blocks and/or files that are unlikely to have common blocks that match other data in the data storage system.

In one implementation, datasets are phase rotated through the post-process deduplication steps. As state above, the post-process deduplication disclosed herein, in some implementations, has four main phases: enumeration, commonality, sharing, and index update. These phases of the deduplication process are described in greater detail below. If the entirety of a data storage system completed each phases in full, it may have the potential to create bottlenecks in the post-process deduplication process. Instead, phases can be completed for smaller datasets of the data storage system, where datasets can be processed through the 4 general stages of deduplication, before moving on to the next dataset. Thus, benefits of the data deduplication process can start appearing incrementally as the process unfolds.

The term "inode" or "logical inode" ("LIN") as used herein refers to in-memory representation of on-disk data structures that may store information, or meta-data, about files and directories, such as file size, file ownership, access mode (read, write, execute permissions), time and date of creation and modification, file types, data protection process information, etc. In one implementation, LIN's may be in a known location in a file system, for example, residing in cache memory for fast and/or efficient access by the file system. Before or in conjunction with performing a file system operation on a file or directory, the system call may access the contents of the LIN and/or the contents of the file in determining how to process the system call. In some implementations, a data structure explicitly named "inode" or LIN may be absent, but file systems may have data structures that store data similar to LINs and may provide capabilities similar to LINs as described herein. It can be appreciated that the concepts and implementations as provided herein are functional using data structures not termed LINs or inodes but that offer the same functionality to the file system.

Referring now to FIG. 1, there is illustrated an example of phase rotation of datasets in accordance with implementations of this disclosure. At the top of the figure, a data storage system 102 is depicted having three File System Nodes: File System Node 1, File System Node 2, and File System Node X (where X is a positive integer). It can be appreciated that a distributed file system can have many more nodes than the three depicted in FIG. 1. The internal structure of a file system node, i.e., a blade server, are disclosed in greater detail with regard to FIGS. 9 and 10 below. In general, file system nodes share responsibility for storing data in a distributed storage system environment.

One way to implement post-process deduplication would be to process the entirety of data residing in data storage system 102 in one batch. For example, first, the entire set of data in Data Storage System 102 enters and completes the enumeration phase. Once complete with the enumeration phase, the entire set enters the commonality phase, followed by the sharing phase/file system update phase and finally the index update phase. However, if every phase is finished to completion, with the entire data storage system 102, bottlenecks may arise in at least the enumeration phase or the commonality phase. For example, in the enumeration phase, the entirety of the dataset is scanned, analyzed, and sets of hashes are generated. In large scale storage systems, it's possible that the enumeration phase for the entire dataset could take days or even weeks to complete. Another bottleneck example is during the commonality phase when matching items in the candidate list, the larger the candidate list the more system resources it consumes and the more potential matching has to occur. For these and other reasons, implementations disclosed herein provide for phase rotation.

Data storage system 102 can be divided into Datasets, depicted in figure one as dataset 1, dataset 2, dataset 3, dataset 4, dataset 5, and dataset Y (where "Y" is a positive integer). In one implementations, the datasets do not overlap. A dataset can include data stored on multiple nodes. For example, dataset 1 can include data stored on File System Node 1 and File System Node 2. Through the use of datasets, each phase is partially completed, e.g., limited to the current dataset rather than the entirety of data storage system 102, for individual datasets. Thus, a first dataset is processed through each phase of deduplication, and upon its completion, or alternatively based on a pre-planned schedule; a second dataset can then proceed through each phase of deduplication.

It can be appreciated that by limiting phase rotation to datasets, the size of datasets can be controlled as well. For example, if a data storage system has excess capacity during non-peak hours to perform deduplication processing, datasets can be configured to a size that can be processed during non-peak hours. It can further be appreciated that by limiting phase rotation to datasets, incremental benefits to deduplication are garnered as datasets as processed. For example, if a data storage system is divided into a hundred datasets and the data storage system can process one dataset per day, you could see results of deduplication and shared data after processing just one dataset versus having to wait for the entirety of the post-process deduplication process to complete on the entire data storage system.

Figure 2:
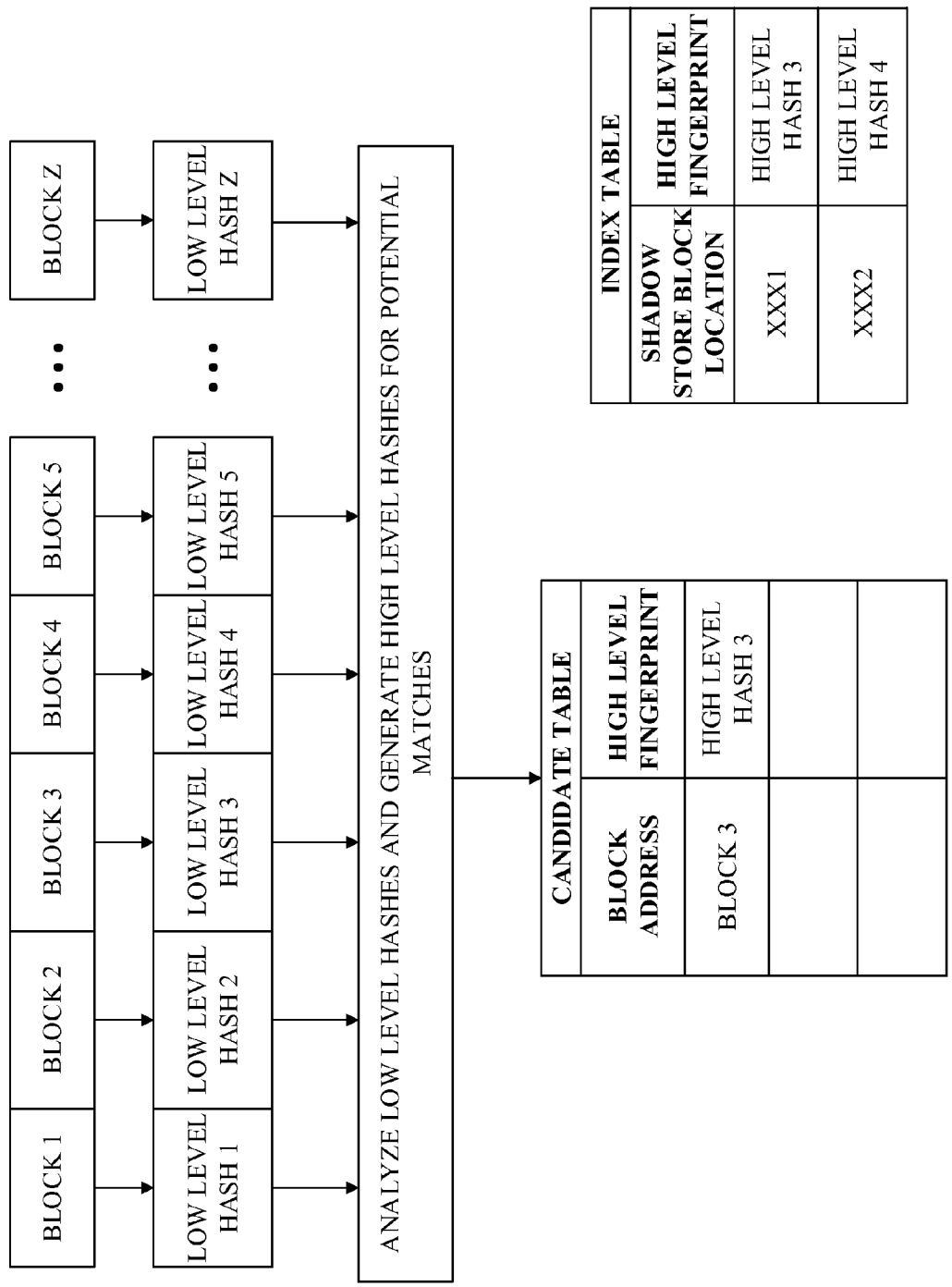
FIG. 2 illustrates an example of multi-level hashing in accordance with implementations of this disclosure.

Referring now to FIG. 2, there is illustrated an example of multi-level hashing in accordance with implementations of this disclosure. At the top of FIG. 2, a dataset from FIG. 1 is split into blocks. It can be appreciated that in a file based storage system, files can be split into blocks as a part of dividing a data storage system into datasets. Block 1, Block 2, Block 3, Block 4, Block 5, and Block Z (where Z is a positive integer) are depicted on FIG. 2. It can be appreciated that the amount of blocks is dependent on the size of a dataset. For each block in the dataset, a low level hash can be generated. In one implementation, the low level hashes can be generated automatically by the file system outside of the deduplication context and can be identified and read during the deduplication process. It can be appreciated that low level hashes are relatively cheap to generate in that they do not consume large amount of compute resources in their generation versus high level hashes. In one implementation, low level hashes are 32-bit checksums. In an implementation with multiple file system nodes, hashes can be generated locally on the node where the data is stored. It can be appreciated that by generating hashes on the data locally on the storage node, the data itself does not need to be sent to another file system node or a network element performing the deduplication process, rather, if necessary, just the hash can be sent. By sending just the hash, network traffic during the deduplication process can be minimized. It can be appreciated that high level hashes as described below can be generated locally.

After reading low level hashes for each block in the dataset, an analysis can take place to determine which low level hashes have a greater chance to be potential matching candidates. For example, potential matching candidates can be determined by whether the low level hash is a multiple of a sampling interval. In another example, an algorithm that identifies low-level hashes with a greater probability of matching other data blocks can be used. In one implementation, a machine learning algorithm can be used that identifies and analyzes low level hashes that have previously matched other data. It can be appreciated that, in some implementations, random algorithms and/or intelligent algorithms can be used to identify potential matching candidates.

For low level hashes identified as potential matching candidates, a high level hash can be generated based on the original block data for the low level hash. The high level hash or high level fingerprint can then be stored in a candidate table along with a block address for the data the high level hash represents. The candidate table then stores the high level hashes generated from the set of potential matches. In FIG. 2, only a single low level hash, specifically, low level hash 3, was identified as a potential matching candidate. Thus, a high level hash 3 was generated and added to the candidate table along with the block address for block 3.

As the candidate table is populated, or in one implementation, after an entire dataset is analyzed and a candidate table is populated from that dataset, potential matches, i.e., commonality, can be identified. For example, high level hashes of the candidate table can be compared to other high level hashes of the candidate table and high level hashes from an index table. It can be appreciated that the index table stores high level hashes and shadow store block locations for previously identified commonality. Thus, in determining whether a high level hash in the candidate table has a match, it is desirable to search not only previously identified commonality in the index table but also other hashes in the candidate table that have yet to matched.

In one implementation, after a match is identified, the range of a match is extended as far as possible. For example, as depicted in FIG. 2, after analyzing low level hashes, a single high level hash was generated based on the data in block 3. Commonality is then identified based on high level hash 3 also being present in the index table as previously identified commonality. After high level hash 3 was identified as commonality, implementations provide for attempting to match neighboring blocks of block 3. Thus, a byte-by-byte data comparison can be made between the neighboring blocks of the ingested block and the neighboring blocks of the identified commonality. In one implementation, if the candidate table and index table indicate that blocks in multiple inodes are sharing the same commonality, an analysis can be made to determine whether the sharing range can be extended for the ingested block as compared to each of the multiple file inodes already sharing the same commonality. It can be appreciated that this process can repeat to extend the range of a match to the furthest extent possible.

When a high level hash in the candidate table is determined to be a match of a high level hash in the index table, data at the block address of the candidate, can be replaced by a pointer that points to the location of the data in the shadow store where the commonality is stored.

When a high level hash in the candidate table is determined to be a match of another high level hash in the candidate table, it can first be determined whether there is another match in the index table. If there is another match in the index table, both matches in the candidate table can be modified as described in the preceding paragraph, as the original data is already stored in the shadow store. If there is not another match in the index table, then the data from the original block location can be copied to a shadow store, and a new entry can be added to the index table stating the shadow store block location where the data was stored, and a copy of the high level hash. Thus, previously identified and newly identified blocks that match the block copied to the shadow store can point to the shadow store block location.

In one implementation, after a high level hash in the candidate table is determined to match another entry in the candidate table or an entry in the index table, an amount of space saved by moving the data to the shadow store can be determined for each match. Rather than moving the data to the shadow store and/or creating a pointer to the shadow store for the original data of the match, the amount of space saved for each match can be aggregated for an entire dataset to determine a deduplication dry run estimate on the amount space that could be saved during deduplication.

Referring now to FIG. 3, there is illustrated an example reverse mapping table in accordance with implementations of this disclosure. In some implementations, a reverse mapping table can be maintained as part of the deduplication process. Each time a new candidate is identified as a match, and a pointer is established to the shadow store, an entry can be added to a reverse mapping table. The entry can include the file inode associated with the match and a shadow store reference that references the location in the shadow store where the original data is stored. Thus, each row in the reverse map table contains one shadow store inode and multiple file inode numbers. It can be appreciated that no additional analysis is done at the time of entering an entry into the reverse mapping table, and thus no additional compute resources are used. Thus, it's possible that as data in a file inode is changed, the reverse mapping table may contain entries to file inodes that no longer point to the shadow store reference as listed in the reverse mapping table. However, the reverse mapping table will be a superset, if not the exact set, of files pointing to the shadow store.

The snapshot identifier can be used to determine whether an entry of the reverse mapping table is stale. For example, if the file inode has been updated after an entry associated with the file inode was added to the reverse mapping table, it can have a more current snapshot identifier. Thus, if the snapshot identifier associated with the file inode does not match the snapshot identifier associated with the file inode in the reverse mapping table, the entry can be determined to be stale. In one example, if there is a corruption in the shadow store, snapshot versions of the file can be checked to find the actual snapshot identifier of the shadow store that is referenced.

Figure 4:
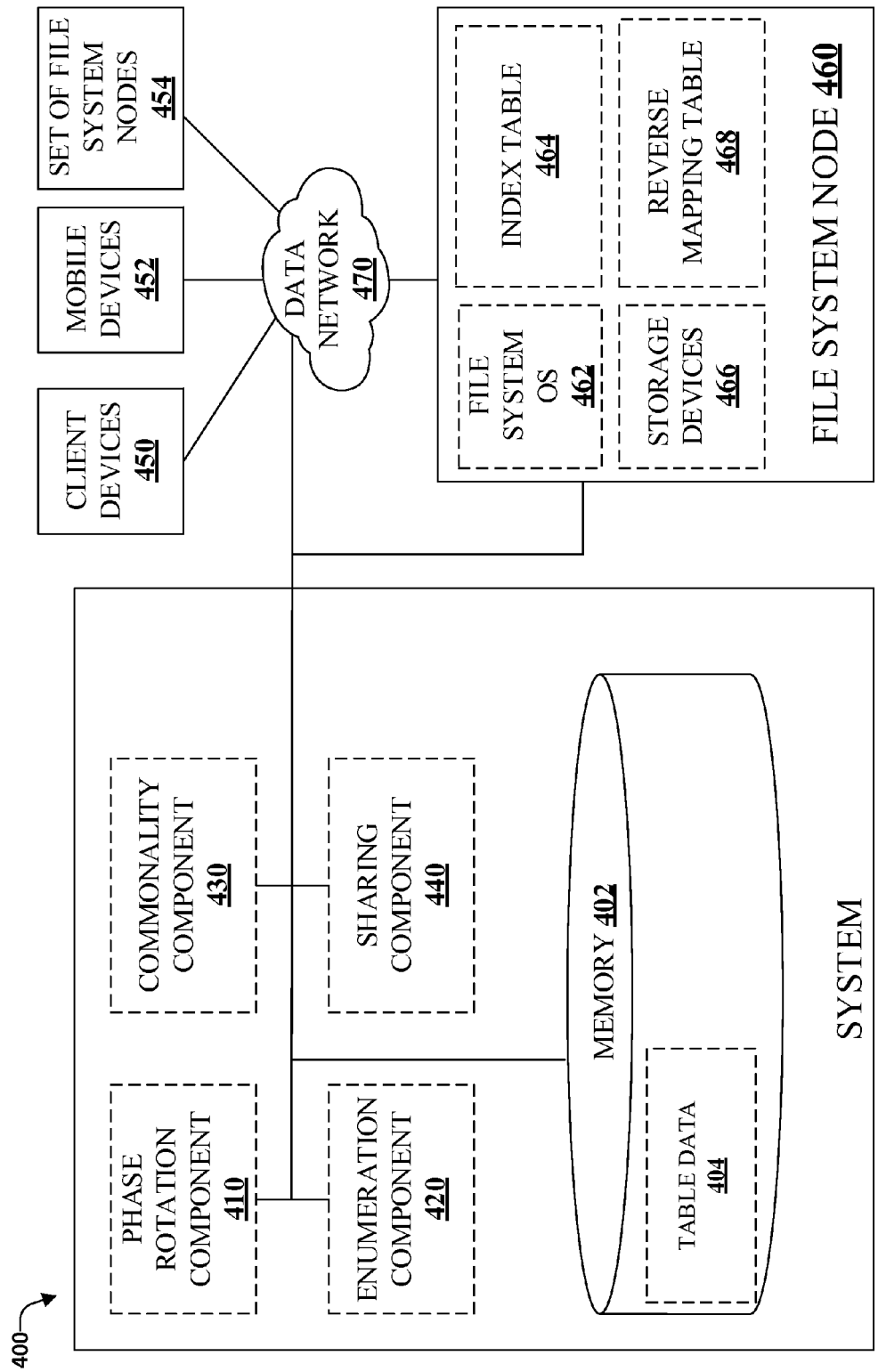
FIG. 4 illustrates an example system for scalable post process deduplication in accordance with implementations of this disclosure.

Referring now to FIG. 4, there is illustrated an example system 400 for scalable post process deduplication in accordance with implementations of this disclosure. System 400 includes a phase rotation component 410, an enumeration component 420, a commonality component 430, a sharing component 440, and a memory 402. System 400 can be in communication with data network 470 and/or file system node 460. It can be appreciated that client devices 450, mobile devices 452 and a set of file system nodes 454 can be in communication with data network 470 and/or system 400.

Phase rotation component 410 can generate a set of datasets of a file system, wherein the set of datasets includes at least a first dataset and a second dataset, and wherein the phase rotation component sends the first dataset to the enumeration component for ingestion. It can be appreciated the set of datasets can comprise data stored on file system node 460 and the set of file system nodes 454. In some implementations, individual datasets can include data from more than one file system node. In one implementation, the first dataset and the second dataset do not overlap. It can be appreciated that ingesting overlapping datasets is possible, but can be less efficient as data is ingested and subsequently matched twice.

Enumeration component 420 can ingest a dataset. Ingesting can include scanning the dataset and reading a set of low level hashes based on the scanning, wherein low level hashes in the set of low level hashes are associated with a block address of the file system. One implementation, low level hashes can be a 32-bit checksum. It can be appreciated that other methods of low level hashing can be used such in multi-level hashing implementations, such that the size and computational cost in generating, transmitting, or reading the low level hash is less than the size and/or computational cost, respectively, in generating, transmitting, or reading high level hashes.

In one implementation, enumeration component 420 scans the dataset based on at least one of a sampled attribute associated with files of the dataset or an exclude attribute associated with files of the dataset. For example, if a file was previously sampled it can be flagged with a sampled attribute. In another example, a file can be flagged with an exclude attribute, such as when a user or administrator or another file system operation does not wish the file to be deduplicated. It can be appreciated that enumeration component 420 can read these flags and avoid resampling previously sampled data or avoid sampling data that is not desirable for deduplication and under both scenarios, improve the efficiency of the scanning process by avoiding unnecessary scans. In one implementation, sampled attribute flags or exclude attribute flags can be accomplished by adding information to an inode associated with the file. In other implementations, file metadata can include various attributes capable of being read by enumeration component 420.

Enumeration component 420 can further analyze the set of low level hashes and determine a set of potential matching candidates. For example, potential matching candidates can be determined by whether the low level hash is a multiple of a sampling interval. In another example, an algorithm that identifies low-level hashes with a greater probability of matching other data blocks can be used. In one implementation, a machine learning algorithm can be used that identifies and analyzes low level hashes that have previously matched other data. It can be appreciated that, in some implementations, random algorithms and/or intelligent algorithms can be used to identify potential matching candidates.

Enumeration component 420 can also generate a set of high level hashes based on the set of potential matching candidates and associated block addresses. In one implementation, high level hashes are 160-bit "Secure Hash Algorithm-1" i.e., "SHA-1" hashes. As stated above, other types of high level hashes can be used and the subject implementations are not limited by the type or size of the hashes used, such that the size and computational cost in computing and/or reading the low level hash is less than the size and/or computational cost in computing and/or reading high level hashes. Enumeration component 420 can also add the set of high level hashes and associated block addresses to a candidate table. For example, the candidate table can comprise a set of high level hashes and an associated block address for the location of the original un-hashed data.

Commonality component 430 can determine a set of shareable blocks by comparing high level hashes in the set of high level hashes of the candidate table with other high level hashes of the candidate table and an index table, wherein the index table contains a set of high level hashes and associated shadow store block addresses. For example, each file system node in a distributed storage system can contain an index table. The index table can be synched and updated with other file systems nodes. The index table can contain a list of high level hashes that are associated with a block address in a shadow store. It can be appreciated that the index table can keep an active list of high level hashes associated with data that is already stored in the shadow store, e.g., data that was previously identified as commonality and is already being shared by at least two files and/or data blocks. Thus, commonality component 430 can determine the set of shareable blocks by comparing high level hashes in the candidate table with other high level hashes in the candidate table, i.e., potential matching candidates that have yet to be matched, as well as with high level hashes in the index table, i.e., previously matched commonality. It can be further appreciated that as data is deleted from file system nodes, entries in the index table may no longer be being shared by at least two files and/or data blocks.

Sharing component 440 updates the file system based on the set of shareable blocks, wherein, in response to the sharing component updating the file system, the phase rotation component sends the second dataset to the enumeration component for ingestion. For example, the phase rotation component waits to determine that the previous dataset has passed through each phase of deduplication, and then supplies the enumeration component 410 with the next dataset for ingestion after the determination.

In one implementation, sharing component 440 updates the file system by storing a set of data blocks in the shadow store based on the block address associated with a shareable block in the set of shareable blocks. For example, when the shadow store does not already store the set of shareable blocks, e.g., the match was made with another entry from the candidate table and not the index table; the sharable blocks can be added to the shadow store. In one implementation, sharing component 440 updates the file system by generating a shadow store pointer for a shareable block in the set of shareable blocks, wherein the shadow store pointer points to a shadow store block address. For example, if the shareable blocks are already stored in the shadow store, then the blocks stored at the block address associated with the shareable blocks can be replaced by other data. For example, a pointer that prior to deduplication points to the a block address of the data, can be replaced with a pointer to a shadow store address where the commonality is stored. It can be appreciated that the commonality pointer can be stored in a known location of a file metadata structure, such as the portion of the metadata structure that stores the location of the physical block address of the data. It can be appreciated that by updating the pointer in the file metadata structure to point to the shadow store data blocks, the physical block location that the pointer previously pointed to, e.g., the original data, can be freed for use for other storage requirements. In one implementation, the block address of the original data can be erased in response to or contemporaneously with changing the pointer to point to the shadow store location of the commonality. In one implementation, sharing component 440 updates the file system by updating the index table based on the high level hash associated with the shareable block and a shadow store block address. For example, if the match was with two entries from the candidate table, and the shadow store was updated to store the matched commonality, the index tables stored on respective nodes are updated to include the high level hash of the data stored in the shadow store and the location of where that data is stored in the shadow store.

In one implementation, sharing component 440 updates the file system by at least adding an entry to a reverse mapping table for shareable blocks in the set of shareable blocks wherein the entry includes at least a file identifier and a shadow store identifier.

Figure 5:
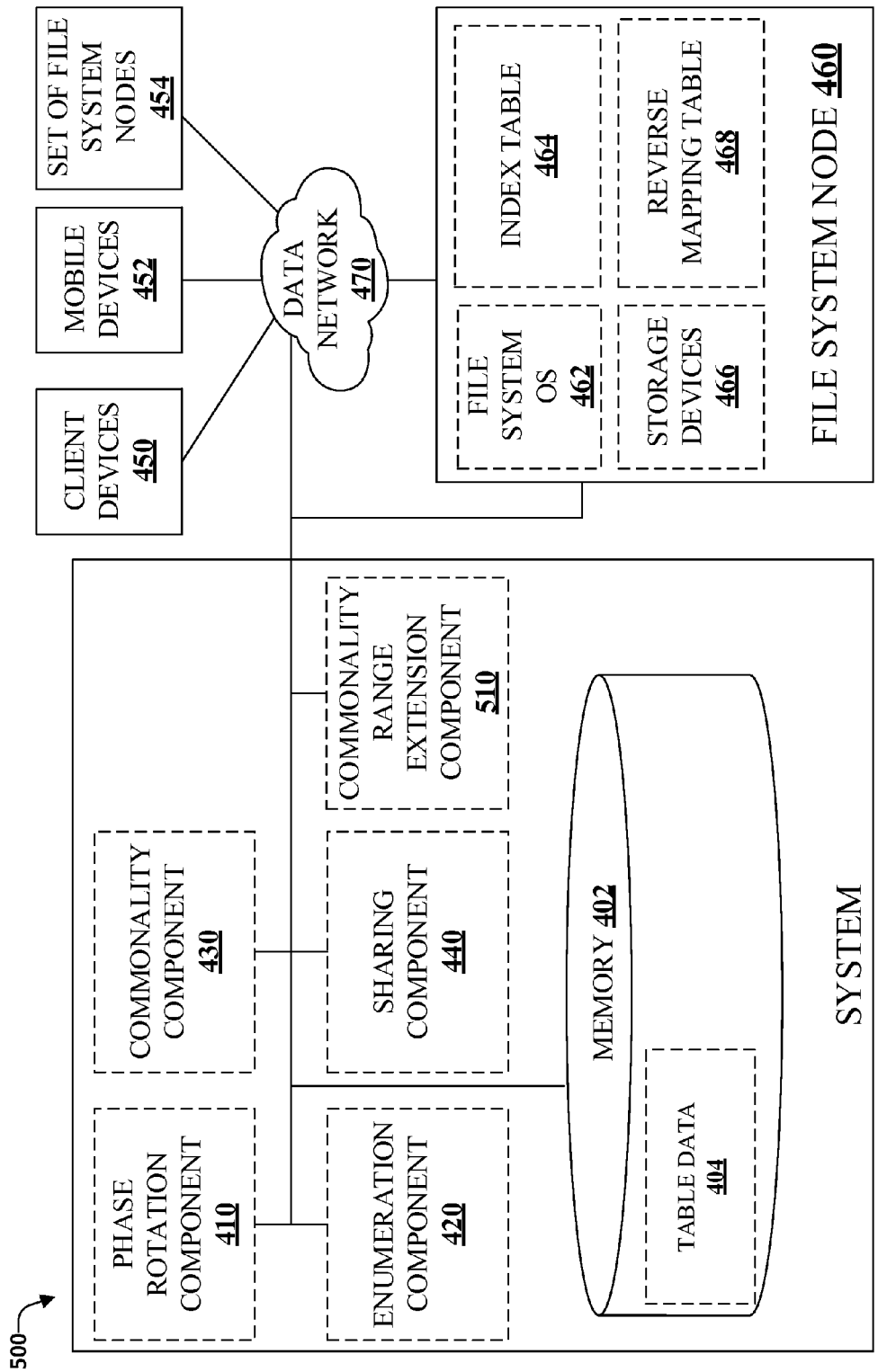
FIG. 5 illustrates an example system for scalable post process deduplication including a commonality range extension component in accordance with implementations of this disclosure.

Referring now to FIG. 5, there is illustrated an example system for scalable post process deduplication including a commonality range extension component 510 in accordance with implementations of this disclosure. Commonality range extension component 510 can determine a largest shareable range for shareable blocks in the set of shareable blocks by analyzing neighboring blocks of the block addresses associated with the shareable blocks, wherein the enumeration component generates a set of range extended high level hashes and associated block addresses based on the largest shareable range, and adds the set of range extended high level hashes and associated block addresses to the candidate table. For example, once two files and/or blocks are found to share commonality by commonality component 430, commonality range extension component 510 attempts to share the largest chunk of data possible by extending the range surrounding the commonality. Thus, if some of the blocks surrounding the commonality were not identified as potential matching candidates by enumeration component 410, commonality range extension component 510 can make a byte-by-byte data comparison between the neighboring blocks of the ingested block and the neighboring blocks of the identified commonality. It can be appreciated that by extending the range of commonality, a higher deduplication ratio can be potentially achieved.

Figure 6:
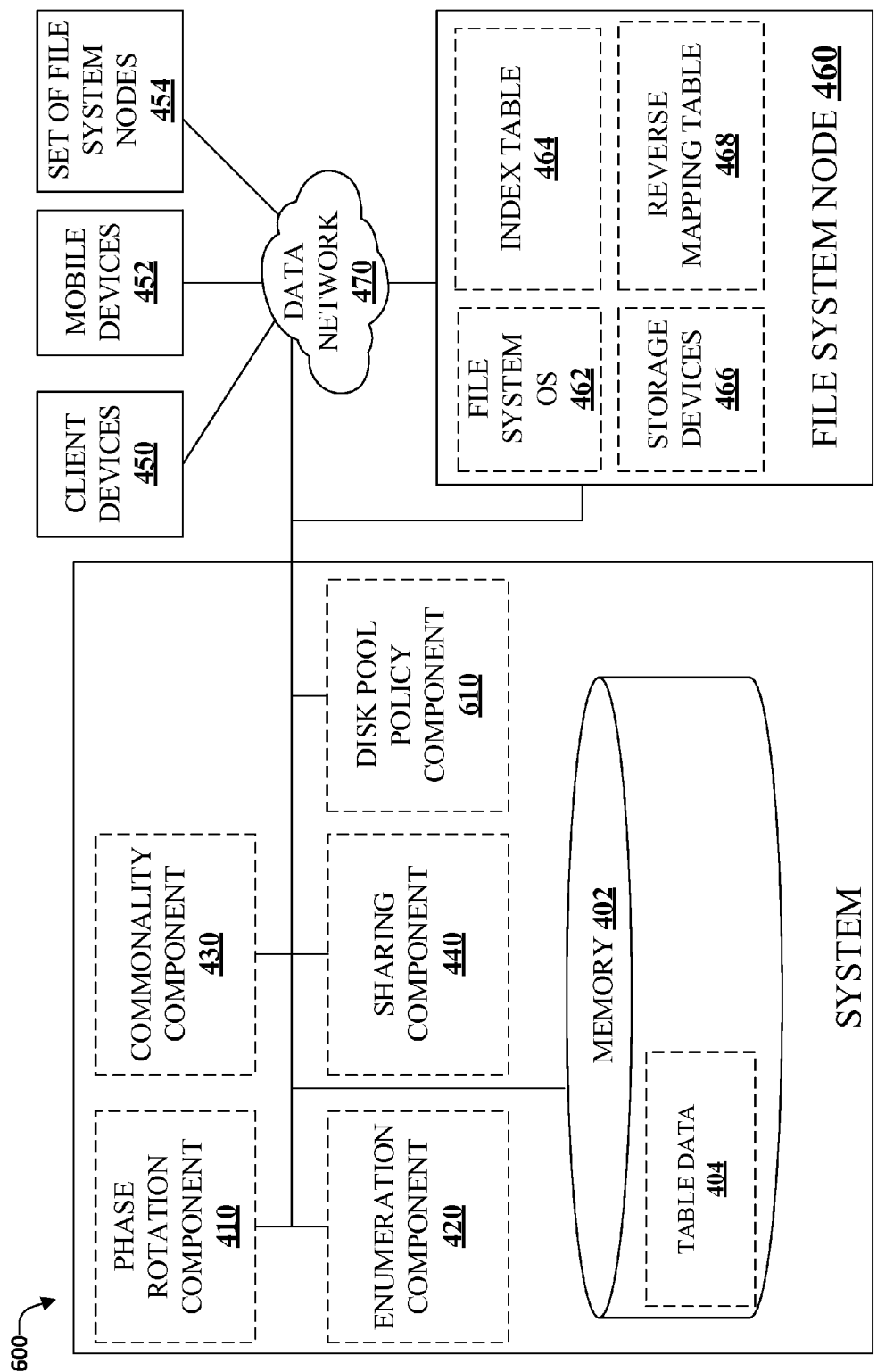
FIG. 6 illustrates an example system for scalable post process deduplication including a disk pool policy component in accordance with implementations of this disclosure.

Referring now to FIG. 6, there is illustrated an example system for scalable post process deduplication including a disk pool policy component in accordance with implementations of this disclosure. Disk pool policy component 610 can, in response to the enumeration component generating a set of high level hashes, determine and associate a disk pool policy identifier with high level hashes in the set of high level hashes, wherein the commonality component further determines the set of shareable blocks based on the disk pool policy identifier. For example, in some distributed storage systems, storage node disc pools are created based on differences between hardware and/or software, e.g., processors, disks, operating environment, etc. Thus, a user can designate different files and/or data blocks to different disk pools using a set of rules. Disk pool policy component 610 can ensure that those disk pool policies are still followed during deduplication. For example, it can allow the attempted sharing of data blocks and/or files belonging to the same disk pool while preventing the sharing of data blocks and/or files between differing disk pools. In one implementation, the disk pool policy identifier can be associated with the high level hash of the sampled block and stored within the candidate table and/or index table.

Figure 7:
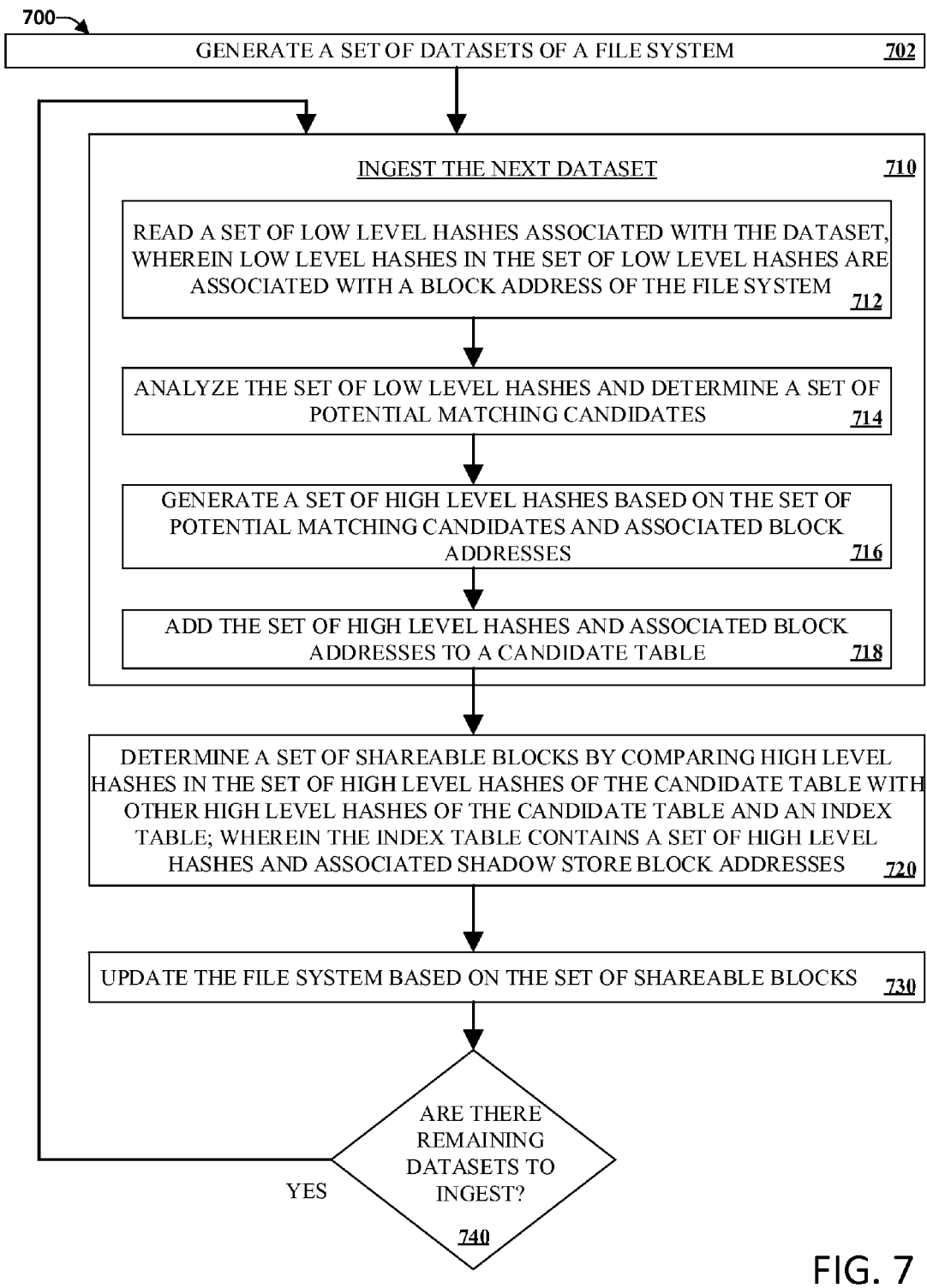
FIG. 7 illustrates an example method for deduplication in accordance with implementations of this disclosure.
Figure 8:
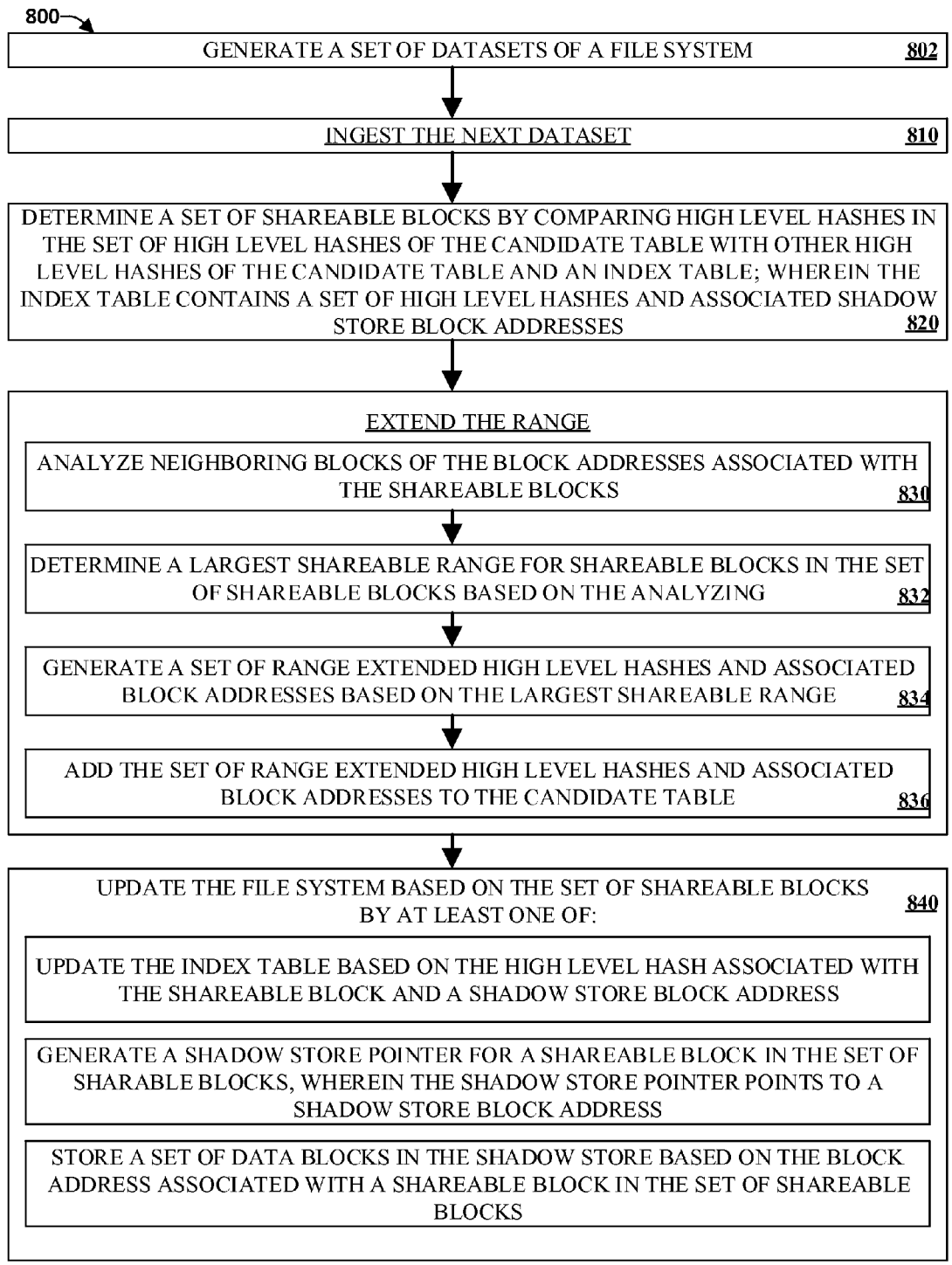
FIG. 8 illustrates an example method for deduplication including range extensions and file system update examples in accordance with implementations of this disclosure.

FIGS. 7-8 illustrate methods and/or flow diagrams in accordance with this disclosure. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 7 illustrates an example method for deduplication in accordance with implementations of this disclosure. At 702, a set of datasets of a file system can be generated, wherein the set of datasets includes at least a first dataset and a second dataset. In one implementation, the first dataset and the second dataset do not overlap.

At 710, the next dataset can be ingested. It can be appreciated that ingestion includes steps 712-718 described below. At 712, the dataset can be scanned and a set of low level hashes can be read based on the scanning, wherein low level hashes in the set of low level hashes are associated with a block address of the file system. It can be appreciated that in some implementations, the file system can already maintain low-level hashes for storage blocks, used in one example, for error correcting. In one implementation, scanning the dataset is based on at least one of a sampled attribute associated with files of the dataset or an exclude attribute associated with files of the dataset. In one implementation, the low level hashes are 32-bit checksums. At 714, the set of low level hashes can be analyzed and a set of potential matching candidates can be determined. At 716, a set of high level hashes can be generated based on the set of potential matching candidates and associated block addresses. In one implementation, the high level hashes are 160-bit SHA1 hashes. At 718, the set of high level hashes and associated block addresses can be added to a candidate table.

At 720, a set of shareable blocks can be determined by comparing high level hashes in the set of high level hashes of the candidate table with other high level hashes of the candidate table and an index table, wherein the index table contains a set of high level hashes and associated shadow store block addresses. In one implementation, in response to the generating the set of high level hashes, a disk pool policy identifier can be determined for high level hashes in the set of high level hashes and the disk pool policy identifier can be associated with the high level hashes, wherein the determining the set of shareable blocks is based on the disk pool policy identifier.

At 730, the file system can be updated based on the set of shareable blocks. In one implementation, updating the file system includes at least adding an entry to a reverse mapping table for shareable blocks in the set of shareable blocks wherein the entry includes at least a file identifier and a shadow store block address. At 740, it can be determined whether there are remaining datasets to ingest. If there are remaining datasets to ingest, the method can continue by processing the next dataset at step 710. If there are no remaining datasets to process, the method can stop.

FIG. 8 illustrates an example method for deduplication including range extensions and file system update examples in accordance with implementations of this disclosure. At 802, a set of datasets of a file system can be generated, wherein the set of datasets includes at least a first dataset and a second dataset. At 810, the next dataset can be ingested. It can be appreciated that ingestion includes steps 712-718 as depicted and described above with respect to FIG. 7.

At 820, a set of shareable blocks can be determined by comparing high level hashes in the set of high level hashes of the candidate table with other high level hashes of the candidate table and an index table, wherein the index table contains a set of high level hashes and associated shadow store block addresses.

Steps 830 through 836 relate to extending the range of shareable blocks. At step 830, neighboring blocks of the block address associated with the shareable blocks can be analyzed. In one implementation, that analysis can be a byte-by-byte comparison of data. At 832, a largest shareable range for shareable blocks in the set of shareable blocks can be determined based on the analyzing. At 834, a set of range extended high level hashes and associated block addresses can be determined and/or generated based on the largest shareable range. For example, if the commonality already exists as an entry in the index table, generating a high level hash is not necessary as the high level hash already resides as an entry in the index table. At 836, the set of range extended high level hashes and associated block addresses can be added to the candidate table.

At 840, the file system can be updated based on the set of shareable blocks by at least one of: storing a set of data blocks in the shadow store based on the block address associated with a shareable block in the set of shareable blocks; generating a shadow store pointer for a shareable block in the set of shareable blocks, wherein the shadow store pointer points to a logical shadow store block address; or updating the index table based on the high level hash associated with the shareable block and a logical shadow store block address. It can be appreciated that the term logical shadow store block address can also be deemed a logical shadow store block address identifier and relate to the location in a logical shadow store where commonality is stored.

Figure 9:
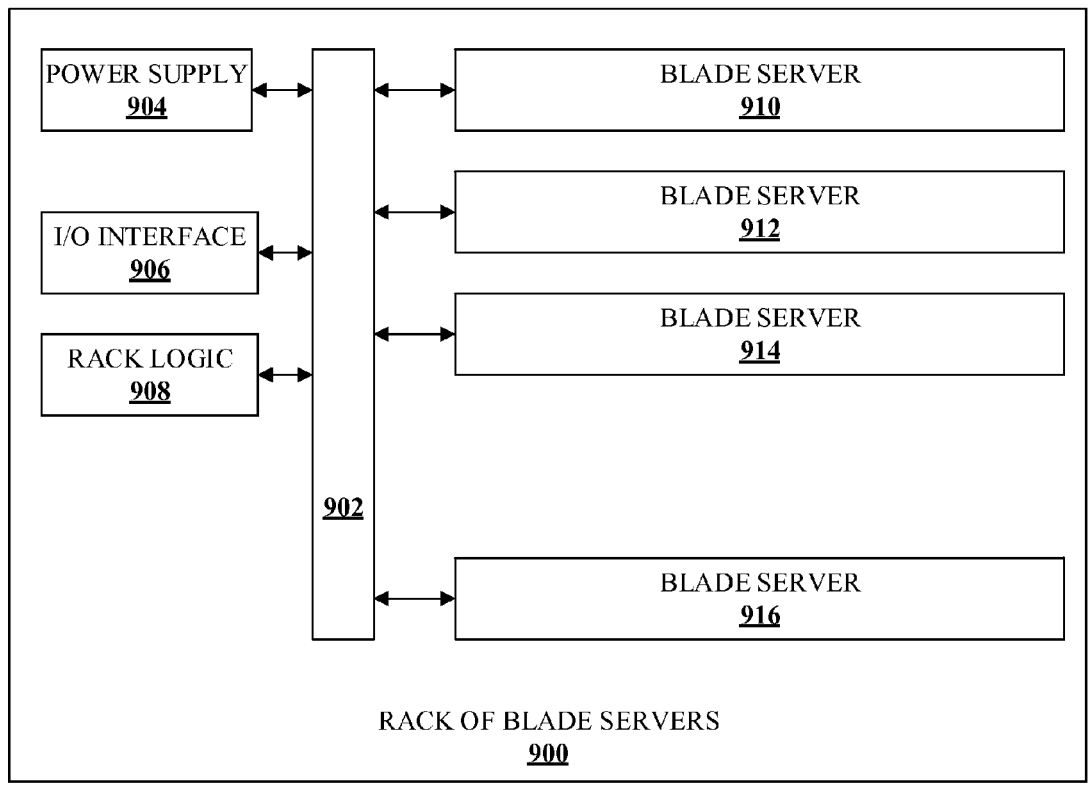
FIG. 9 illustrates an example block diagram of rack of blade servers in accordance with implementations of this disclosure.

FIG. 9 illustrates an example block diagram of rack of blade servers 900 in accordance with implementations of this disclosure. However, the components shown are sufficient to disclose an illustrative implementation. Generally, a blade server is a stripped down server computing device with a modular design optimized to minimize the use of physical space and energy. A blade enclosure can include several blade servers and provide each with power, cooling, network interfaces, input/output interfaces, and resource management. Although not shown, an enclosure of server computers typically includes several computers that merely require a network connection and a power cord connection to operate. Each server computer often includes redundant components for power and interfaces.

As shown in the figure, enclosure 900 contains at least a power supply 904, an input/output interface 906, rack logic 908, several blade servers 910, 912, 914, and 916, and backplane 902. Power supply 904 provides power to each component and blade server within the enclosure. The input/output interface 906 provides internal and external communication for components and blade servers within the enclosure. Backplane 908 can enable passive and active communication of power, logic, input signals, and output signals for each blade server.

It can be appreciated that the Rack of Blade Servers 900 can be in communication with a second rack of blade servers and work in conjunction to provide distributed file system. The term blade server can also be used interchangeably with term "node" and can refer to a physical enclosure with a varying amount of CPU cores, random access memory, flash drive storage, magnetic drive storage, etc. For example, a single blade server could contain, in one example, 36 disk drive bays with attached disk storage in each bay.

Figure 10:
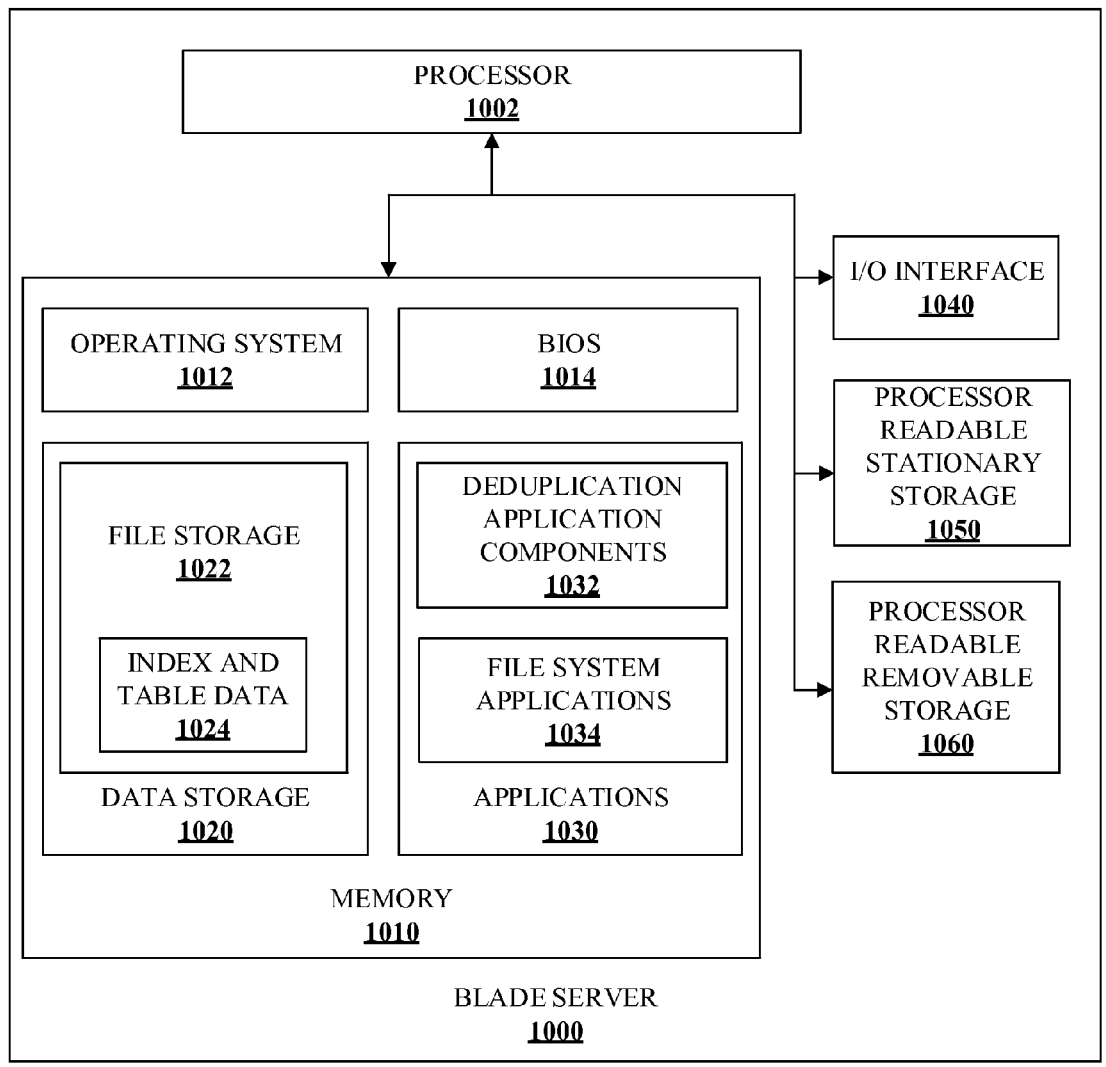
FIG. 10 illustrates an example block diagram of a blade server in accordance with implementations of this disclosure.

FIG. 10 illustrates an example block diagram of a blade server 1000 in accordance with implementations of this disclosure. As shown in FIG. 9, a plurality of blade servers may be included in one enclosure that shares resources provided by the enclosure to reduce size, power, and cost.

Blade server 1000 includes processor 1002 which communicates with memory 1010 via a bus. Blade server 1000 also includes input/output interface 1040, processor-readable stationary storage device(s) 1050, and processor-readable removable storage device(s) 1060. Input/output interface 1040 can enable blade server 1000 to communicate with other blade servers, mobile devices, network devices, and the like. Processor-readable stationary storage device 1050 may include one or more devices such as an electromagnetic storage device (hard disk), solid state hard disk (SSD), hybrid of both an SSD and a hard disk, and the like. In some configurations, a blade server may include many storage devices. Also, processor-readable removable storage device 1060 enables processor 1002 to read non-transitive storage media for storing and accessing processor-readable instructions, modules, data structures, and other forms of data. The non-transitive storage media may include Flash drives, tape media, floppy media, disc media, and the like.

Memory 1010 may include Random Access Memory (RAM), Read-Only Memory (ROM), hybrid of RAM and ROM, and the like. As shown, memory 1010 includes operating system 1012 and basic input/output system (BIOS) 1014 for enabling the operation of blade server 1000. In various embodiments, a general-purpose operating system may be employed such as a version of UNIX, LINUX™, a specialized server operating system such as Microsoft's Windows Server™ and Apple Computer's IoS Server™, or the like.

Applications 1030 may include processor executable instructions which, when executed by blade server 1000, transmit, receive, and/or otherwise process messages, audio, video, and enable communication with other networked computing devices. Examples of application programs include database servers, file servers, calendars, transcoders, and so forth. Applications 1030 may include, for example, file system applications 1034, and deduplication application components 1032 according to implementations of this disclosure. It can be appreciated that deduplication application component 1032 need not reside within blade server 1000 for all implementations, as shown and discussed with respect to FIGS. 4-6.

Human interface components (not pictured), may be remotely associated with blade server 1000, which can enable remote input to and/or output from blade server 1000. For example, information to a display or from a keyboard can be routed through the input/output interface 1040 to appropriate peripheral human interface components that are remotely located. Examples of peripheral human interface components include, but are not limited to, an audio interface, a display, keypad, pointing device, touch interface, and the like.

Data storage 1020 may reside within memory 1010 as well, storing file storage 1022 data such as metadata or LIN data. It can be appreciated that LIN data and/or metadata can relate to rile storage within processor readable stationary storage 1050 and/or processor readable removable storage 1060. For example, LIN data may be cached in memory 1010 for faster or more efficient frequent access versus being stored within processor readable stationary storage 1050. In addition, Data storage 1020 can also host index and table data 1024 such as a candidate table, an index table, a reverse mapping table, etc. in accordance with implementations of this disclosure. Index and table data can be stored as files in file storage 1022.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A system comprising:
a memory that has stored thereon computer executable components; and
at least one processor that executes the following computer executable components stored in the memory:
a phase rotation component that generates a set of datasets of a file system, wherein the set of datasets includes at least a first dataset and a second dataset, and wherein the phase rotation component sends the first dataset to the enumeration component for ingestion;
an enumeration component that ingests a dataset by:
reading a set of low level hashes associated with the dataset, wherein low level hashes in the set of low level hashes are associated with a logical block identifier of the file system;
analyzing the set of low level hashes and determining a set of potential matching candidates;
generating a set of high level hashes based on the set of potential matching candidates and associated logical block identifiers; and
adding the set of high level hashes and associated logical block identifiers to a candidate table;
a disk pool policy component that in response to the enumeration component generating a set of high level hashes, determines and associates a disk pool policy identifier with high level hashes in the set of high level hashes;
a commonality component that determines a set of shareable blocks by comparing high level hashes in the set of high level hashes of the candidate table with other high level hashes of the candidate table and an index table, wherein the index table contains a set of high level hashes, associated disk pool policy identifiers, and associated shadow store logical block identifiers, and wherein the set of shareable blocks is based on common disk pool policy identifiers; and
a sharing component that updates the file system based on the set of shareable blocks, wherein, in response to the sharing component updating the file system, the phase rotation component sends the second dataset to the enumeration component for ingestion.

2. The system of claim 1, wherein the sharing component updates the file system by at least one of:
storing a set of data blocks in the shadow store based on the block address associated with a shareable block in the set of shareable blocks;
generating a shadow store pointer for a shareable block in the set of shareable blocks and updating a metadata structure associated with the shareable block with the shadow store pointer, wherein the shadow store pointer points to a shadow store block address; or
updating the index table based on the high level hash associated with the shareable block and a shadow store logical block identifier.

3. The system of claim 1, wherein the first dataset and the second dataset do not overlap.

4. The system of claim 1, further comprising:
a commonality range extension component that determines a largest shareable range for shareable blocks in the set of shareable blocks by analyzing neighboring blocks of the logical block identifiers associated with the shareable blocks.

5. The system of claim 1, wherein the enumeration component ingests the dataset based on at least one of a sampled attribute associated with files of the dataset or an exclude attribute associated with files of the dataset.

6. The system of claim 1, wherein the sharing component updates the file system by at least adding an entry to a reverse mapping table for shareable blocks in the set of shareable blocks wherein the entry includes at least a file identifier and a shadow store logical block identifier.

7. The system of claim 1, wherein the index table is empty.

8. The system of claim 1, wherein the low level hashes are 32-bit checksums.

9. The system of claim 1, wherein the high level hashes are 160 bit SHA1 hashes.

10. A method comprising:
generating a set of datasets of a file system, wherein the set of datasets includes at least a first dataset and a second dataset;
ingesting the first dataset, wherein ingesting a dataset includes:
scanning the dataset and reading a set of low level hashes based on the scanning, wherein low level hashes in the set of low level hashes are associated with a logical block identifier of the file system;
analyzing the set of low level hashes and determining a set of potential matching candidates;
generating a set of high level hashes based on the set of potential matching candidates and associated logical block identifiers;
in response to the generating the set of high level hashes, determining a disk pool policy identifier for high level hashes in the set of high level hashes;
associating the determined disk pool policy identifier with high level hashes in the set of high level hashes; and
adding the set of high level hashes and associated logical block identifiers to a candidate table;
determining a set of shareable blocks by comparing high level hashes in the set of high level hashes of the candidate table with other high level hashes of the candidate table and an index table, based in part on the set of shareable blocks having common disk pool policy identifiers, wherein the index table contains a set of high level hashes, associated disk pool identifers and associated shadow store logical block identifiers;
updating the file system based on the set of shareable blocks; and
in response to the updating the file system, ingesting the second dataset.

11. The method of claim 10, wherein the updating the file system includes at least one of:
storing a set of data blocks in the shadow store based on the block address associated with a shareable block in the set of shareable blocks;
generating a shadow store pointer for a shareable block in the set of shareable blocks and updating a metadata structure associated with the shareable block with the shadow store pointer, wherein the shadow store pointer points to a shadow store logical block identifier; or
updating the index table based on the high level hash associated with the shareable block and a shadow store block address.

12. The method of claim 10, wherein the first dataset and the second dataset do not overlap.

13. The method of claim 10, further comprising:
analyzing neighboring blocks of the block addresses associated with the shareable blocks, determining a largest shareable range for shareable blocks in the set of shareable blocks based on the analyzing, wherein updating the file system is based on the largest shareable range.

14. The method of claim 10, wherein the scanning the dataset is based on at least one of a sampled attribute associated with files of the dataset or an exclude attribute associated with files of the dataset.

15. The method of claim 10, wherein the updating the file system is at least adding an entry to a reverse mapping table for shareable blocks in the set of shareable blocks wherein the entry includes at least a file identifier and a shadow store logical block identifier.

16. The method of claim 10, wherein the index table is empty.

17. The method of claim 10, wherein the low level hashes are 32-bit checksums.

18. The method of claim 10, wherein the high level hashes are 160 bit SHA1 hashes.

* * * * *